United States Patent Office 3,149,974
Patented Sept. 22, 1964

3,149,974
GELATINO SILVER HALIDE EMULSION LAYERS CONTAINING SULFOFLUORIDE HARDENERS
Daniël Aloïs Claeys, Mortsel-Antwerp, Francis Jeanne Sels, Kontich-Antwerp, Marcel Nicolas Vrancken, Berchem-Antwerp, and Jozef Frans Willems, Wilrijk-Antwerp, Belgium, assignors to Gevaert Photo-Producten N.V., Mortsel, Belgium, a Belgian company
No Drawing. Filed Jan. 16, 1961, Ser. No. 82,725
Claims priority, application Belgium, Jan. 19, 1960, 39,504, Patent 586,694
3 Claims. (Cl. 96—111)

The present invention relates to an improved method for hardening proteins and proteinaceous substances, more particularly gelatin, and especially for the hardening of photographic gelatin layers.

It is generally known to harden soluble or fusible macromolecular products after shaping, which allows one to couple the special properties of the starting materials with a lower solubility and a higher thermostability.

Thus by the use of gelatin in photographic emulsion layers, it is important to harden the gelatin in order to render it more resistant to warm aqueous solutions with widely varying pH-values. Indeed, an unhardened gelatin layer softens already at 30° C. and loses then its firmness, whereas gelatin containing emulsion layers have to be resistant to treatments at relatively high temperatures in successive baths which widely vary in pH.

In the case the starting materials are proteinaceous such as e.g. gelatin, casein, zein, collagen, they may be hardened by treatment with metal salts of organic compounds which confers a lower-solubility and a lower water-absorption at a higher heat-resistivity to the finished material.

As metal salts may be mentioned e.g. chromium, aluminum and zirconium salts.

As organic products known in this connection may be cited e.g. aldehydes such as formaldehyde, acetaldehyde, arcrolein, glyoxal and derivatives; mixtures of an aliphatic aldehyde and an aromatic compound, the nucleus of which bearing at least one hydroxyl group such as phenyl, resorcinol and resorcyl aldehyde; compounds having two or more reactive groups which thus can cross-link the polypeptide chain such as diketones, polyanhydrides, polyepoxides and compounds having at least two ethyleneimino groups (Belgian patent specification 575,440); reaction products of macromolecular compounds having amino- and/or hydroxyl groups with some classes of unsaturated aliphatic compounds having carboxyl groups (Belgian patent specifications 552,537, 565,859 and 565,862); high molecular polysaccharides having secondary alcohol groups oxidized to aldehyde groups (British patent application 11,400/57); and well-defined classes of sulfofluorides (Belgian patent specifications 571,228 and 571,229).

The hitherto known hardening agents, however, do not always give satisfactory results. Thus, the metal salts show the property of reacting very quickly, so that the addition of the required quantity to obtain the desired hardening runs the risk of coagulating the protein solution before coating or shaping.

Hardeners, such as formaldehyde are partly volatilized during drying of the materials so that an accurate dosage is very difficult to arrive at.

Moreover, the known hardeners of the organic type generally act slowly, so that a long storage time is necessary in order to attain a sufficiently stabilized state of hardening and/or require a strong heating to reach the sufficient degree of hardening, which in the case of photographic silver halide emulsion layers may easily lead to reduction in sensitivity and fog formation.

It has now been found that proteinaceous materials may be hardened by incorporating therein products of the following general formula:

$$FO_2S—Ar—(X)_{n-1}—COOH$$

wherein:

Ar is a bivalent aromatic nucleus selected from the group consisting of the phenylene series and the naphthylene series;

X is a bivalent organic radical selected from the group consisting of an alkylene radical (such as a methylene radical and an ethylene radical), an alkylidene radical (such as an ethylidene radical), a —NH-alkylene radical (such as a —NH—CH$_2$—radical), a —O-alkylene radical (such as a —O—CH$_2$— radical, a —S-alkylene radical (such as a —S—CH$_2$— radical), a —SO$_2$-alkylene radical (such as a —SO$_2$—CH$_2$— radical), a —NHSO$_2$-arylene radical (such as a

—NHSO$_2$—C$_6$H$_5$— radical), a —NHCO-arylene radical (such as a —NHCO—C$_6$H$_4$— radical), a —NHCO-alkylene radical (such as a —NHCO—CH$_2$—CH$_2$— radical), a —NHCO-alkylidene radical (such as a

—NHCO—CH=CH— radical and a

—NHCO—C—CH$_2$—
       ‖
       CH$_2$ radical), a —N=CH-arylene radical (such as a —N=CH—C$_6$H$_4$— radical), a —CONH-arylene radical (such as a —CONH—C$_6$H$_4$— radical), a —CONH-alkylene radical (such as a —CONH—CH$_2$— radical), a —COO-arylene radical (such as a

—CO—O—C$_6$H$_4$— radical), a —COO-alkylene radical (such as a —COO—CH$_2$— radical), a —OCO-alkylene radical (such as a —OCO—CH$_2$—CH$_2$— radical) and a OCO-alkylidene radical (such as a

—OCO—CH=CH— radical), and $n$ is a positive integer as from 1 to 2.

The process provided by the present invention obviates all the aforesaid drawbacks. So it is possible to obtain finally a right hardening by adding the products according to the invention to solutions of proteins, without influencing the physical properties of the solution before coating or during shaping.

As distinct from the m-aminobenzene sulfofluoride described in the Belgian patent specification 571,228 which only give good results when used in well-determined emulsion types, the compounds according to the present invention show the advantage that they come into consideration as hardeners for all the emulsion types; moreover, the concentration required to obtain a well-defined degree of hardening is markedly lower.

The fluorosulfonyl group may be linked on any carbon atom of the aryl nucleus. The same is to be said for the carboxyl group which is attached to the aryl nucleus directly or by means of X.

Hereinafter are given some methods for the preparation of products which can be used in the application of the process according to the present invention.

PREPARATION 1

The preparation of m-fluorosulfonyl benzoic acid is carried out according to the method described in J. prakt. Chem. (2) 117, 1927, p 30.

PREPARATION 2

35 g. of m-fluorosulfonylaniline and 14 g. of bromoacetic acid are dissolved in 130 cm.$^3$ of anhydrous benzene. After stirring and refluxing for some hours the obtained suspension is evaporated in vacuum. The residue is dissolved in water and extracted with ether, the ether solution is separated, dried and distilled off. Melting point of the obtained N-m-fluorosulfonylphenyl amino acetic acid after recrystallization from water: 145–146° C.

*Analysis.*—N calculated: 6%—found: 5.92–6.02%. S calculated: 13.7%—found: 13.55–13.96%.

PREPARATION 3

A mixture of 29.6 g. of cinnamic acid and 100 cm.$^3$ of fluorosulfonic acid is heated for 3 h. at 50–60° C. After about 10 h. of storage at room temperature the mixture is poured onto ice. The precipitate formed is filtered off and washed with water. The p-fluoro-sulfonyl cinnamic acid formed is purified by recrystallization from acetic acid. Melting point: 247° C.

*Analysis.*—S calculated: 13.90%—found: 13.72–13.82%. F calculated: 8.25%—found: 8.45–8.53%.

PREPARATION 4

The preparation of m-fluorosulfonyl salicylic acid is carried out according to the method described in J. prakt. Chem. (2) 117, 1927, p. 81.

PREPARATION 5

After refluxing for 3 h. a solution of 17.5 g. of m-fluorosulfonylaniline and 22 g. of m-chlorosulfonyl benzoic acid in dioxane is poured into water. After solidification the separated oily layer is recrystallized from diluted acetic acid. Melting point of the N-m-fluorosulfonylphenyl-m'-sulfamoylbenzoic acid obtained: 218° C.

*Analysis.*—C calculated: 43.45%—found: 43.68%. H calculated: 2.79%—found: 2.51%. N calculated: 3.90%—found: 3.95–4.11%. S calculated: 17.80%—found: 17.65–17.00%.

PREPARATION 6

Whilst cooling a solution of 22.5 g. of m-fluorosulfonyl benzoyl chloride in ethyl acetate is dropwise added to a solution of 27.4 g. of anthranilic acid in ethyl acetate. The precipitate formed is filtered, washed with water and dried. Melting point of the N-(m'-fluorosulfonyl)-benzoyl anthranilic acid obtained after recrystallization from ethyl acetate: 240–241° C.

*Analysis.*—N calculated: 4.33%—found: 4.32–4.36%. S calculated: 9.90%—found: 10.23–10.15%.

PREPARATION 7

After some hours of refluxing, a solution of 10 g. of succinic anhydride and 17.5 g. of m-fluorosulfonyl aniline in acetonitrile is evaporated in vacuum. Melting point of the m-fluorosulfonyl succinic acid anilide obtained (after recrystallization from diluted dioxane): 164–165° C.

*Analysis.*—N calculated: 5.1%—found: 5.05–5.06%. S calculated: 11.6%—found: 11.63–11.65%.

PREPARATION 8

Whilst heating on the waterbath, a solution of 5.8 g. of p-fluorosulfonyl aniline in anhydrous benzene is added to a solution of 3.2 g. of maleic anhydride in anhydrous benzene. The precipitate formed is filtered and recrystallized from diluted alcohol. Melting point of the p-fluorosulfonyl maleic acid anilide obtained: 210° C.

*Analysis.*—N calculated: 5.1%—found: 5.07–5.08%. S calculated: 11.7%—found: 11.58–11.37%.

PREPARATION 9

This preparation was carried out analogously to the Preparations 7 and 8. Melting point of the m-fluorosulfonyl maleic acid anilide obtained (after recrystallization from dioxane): 160° C.

*Analysis.*—N calculated: 5.12%—found: 5.03–5.06%. S calculated: 11.70%—found: 11.7–11.62%.

PREPARATION 10

After some hours of refluxing the precipitate formed in a solution of 11.2 g. of itaconic anhydride and 17.5 g. of m-fluorosulfonyl aniline in benzene, is filtered and recrystallized from acetonitrile. Melting point of the m-fluorosulfonyl itaconic acid anilide obtained: 174° C.

*Analysis.*—N calculated: 4.87%—found: 4.62–4.64%. S calculated: 11.15%—found: 11.10–11.14%.

PREPARATION 11

Over a period of 2 h. 32 g. of phenoxy acetic acid are dropwise added at 5° C. to 80 cm.$^3$ of fluorosulfonic acid. After stirring for some hours at 5° C. the solution is poured into ice-water and the product obtained is recrystallized from water. Melting point of the m-fluorosulfonyl phenoxyacetic acid obtained: 166° C.

*Analysis.*—C calculated: 41.0%—found: 40.93%. H calculated: 3%—found: 2.89%. S calculated: 13.7%—found: 13.8–14.03%. F calculated: 8.1%—found: 8.14–8.17%.

PREPARATION 12

35 g. of m-fluorosulfonylbenzoyl chloride are dropwise added at 0° C. to a solution of 20.7 g. of salicylic acid and 14.4 g. of pyridine in 250 cm.$^3$ of anhydrous ether. After the reaction mixture is abandoned for some days, the formed precipitate is filtered off. This precipitate is suspended in water in order to dissolve the formed pyridine hydrochloride. The non-dissolved precipitate is filtered off again, dried and recrystallized from benzene. Melting point of the m-(o-carboxyphenoxycarbonyl)-fluorosulfonyl benzene obtained: 146° C.

*Analysis.*—C calculated: 52%—found: 52.34%. H calculated: 2.78%—found: 2.71%.

For applying the method according to the present invention the compounds having the above mentioned formula may be added to the protein-solution, more particularly to the gelatin solution, or to a photographic emulsion before coating. They also can be absorbed by immersion of the proteinaceous mass in a solution of one of these products.

After drying the coated sheets, layers etc. are stored for some time for allowing the hardening reaction to take place. In most cases a storage time of 2–5 days as may suffice.

The pH of the mixture before coating or during storage also influences the hardening reaction. Although the hardening also can occur at a low pH, it is advantageous in the case of gelatin to utilize a neutral or slightly alkaline mixture for rapidly obtaining an intense hardening.

The amounts of hardening agent used according to the invention, as circumstances may require (material to be hardened, hardening required, drying method, pH etc.), may vary within wide limits.

Mostly an amount of 1 to 5% based on the dry gelatin will suffice to obtain the desired effect. The gelatin layers according to the invention have a good resistance to scratching and a markedly lower swelling power. Moreover, they possess a considerably higher resistivity to mechanical damages and a higher softening or melting point in aqueous solutions. This is of the greatest importance for photographic emulsion layers and other gelatin containing auxiliary layers such as e.g. protective layers, antihalation layers, backing layers, filter layers, etc. since the improvement of the physical properties permits a safe treatment of the photographic material in the different processing baths.

The following examples illustrate the present invention without limiting, however, the scope thereof.

*Example 1*

(*a*) To 100 cm.$^3$ of a 5% aqueous gelatin solution with pH 6.5 are added to 2 cm.$^3$ of a 5% alcoholic solution of m-fluorosulfonyl benzoic acid prepared according to the method described in Preparation 1. The thus prepared gelatin solution is coated onto glass-plates, solidified and dried. Already after a storage for some weeks the gelatin layers thus obtained may resist a treatment in boiling water without losing their firmness, whereas a gelatin layer without hardening agent completely dissolves at this temperature. It is to be noted that by use of the corresponding m-chlorosulfonyl benzoic acid no hardening action was found.

(b) To 100 cm.$^3$ of a 5% aqueous solution of casein are added 5 cm.$^3$ of a 5% alcoholic solution of m-fluorosulfonyl benzoic acid. The solution is adjusted to pH 7, coated onto glass-plates and dried. After storing for 36 h. at 50° C. the layers thus formed do not dissolve anymore in boiling water.

*Example 2*

To 100 cm.$^3$ of a 5% aqueous solution of gelatin with pH 7 are added 5 cm.$^3$ of a 5% aqueous solution of N-m-fluorosulfonylphenyl amino acetic acid, obtained according to Preparation 2. The gelating solution is coated onto glass-plates, solidified and dried. The gelatin layers thus obtained are stored for 36 h. at 50° C. and then resist to a treatment in boiling water without losing their firmness.

*Example 3*

5 cm.$^3$ of a 5% solution of p-fluorosulfonyl cinnamic acid obtained according to Preparation 3 are added to 100 cm.$^3$ of a 5% aqueous gelatin solution. The solution is adjusted to pH 6.5, coated onto glass-plates, solidified and dried. Already after a storage for 3 days under normal circumstances of relative humidity and temperature these layers do not dissolve anymore, even in boiling water. The addition of the corresponding acid chloride even in concentrations of 10% based on the gelatin weight does not influence the melting point of the gelatin layer.

*Example 4*

(a) To 100 cm.$^3$ of a 5% aqueous gelatin solution with pH 7 are added 10 cm.$^3$ of a 5% solution of m-fluorosulfonyl salicylic acid prepared according to the method described in J. prakt. Chem. (2), 117, 1927, 81. The gelatin solution is then coated onto glass plates, solidified and dried. After a storage for some days the gelatin layers show a higher resistance to damage on treating them in aqueous baths with different pH-values and at relative high temperature.

(b) 10 cm.$^3$ of a 5% solution in dimethylformamide of 1 - hydroxy-2-carboxy-4-fluorosulfonylnaphthalene, prepared analogously to the preparation of m-fluorosulfonyl salicylic acid hereinbefore are added to 100 cm.$^3$ of a 5% aqueous gelatin solution with pH 7. After treatment in water the gelatin layers obtained after coating, solidifying and drying of this solution, behave analogously as those of Example 4(a).

*Example 5*

To 100 cm.$^3$ of a 5% aqueous gelatin solution are added 5 cm.$^3$ of a 5% solution of N-m-fluorosulfonylphenyl-m'-sulfamoyl benzoic acid obtained according to Preparation 5. The solution is adjusted to pH 7, coated onto glass-plates, solidified and dried. After storage for 36 h. at 50° C. or after a storage for some days at room temperature the layers thus obtained do not dissolve anymore in boiling water.

*Example 6*

To 100 cm.$^3$ of a 5% aqueous solution of gelatin are added 10 cm.$^3$ of a 5% solution in dioxane of N-(m'-fluorosulfonyl)-benzoyl anthranilic acid obtained according to Preparation 6. The gelatin solution is adjusted to pH 7, coated onto glass-plates, solidified and dried. After a storage for 36 h. at 50° C. the layers thus obtained do not dissolve anymore in boiling water.

*Example 7*

To 100 cm.$^3$ of a 5% aqueous solution of gelatin are added 5 cm.$^3$ of a 5% alcoholic solution of m-fluorosulfonyl succinic acid anilide obtained according to Preparation 7. The solution is adjusted to pH 6.5, coated onto glass-plates, solidified and dried. After a storage for some time at room temperature these layers do not dissolve anymore in boiling water.

*Example 8*

(a) To 100 cm.$^3$ of a 5% aqueous solution of gelatin are added 2 cm.$^3$ of a 5% solution of p-fluorosulfonyl maleic acid anilide obtained according to Preparation 8. The gelatin solution is adjusted to pH 7, coated onto glass-plates, solidified and dried. After a storage for some time at room temperature the gelatin layers thus obtained resist to a processing at different pH-values and high temperature (90° C.).

(b) Analogous hardening results were obtained by adding to the gelatin solution m-fluorosulfonyl maleic acid anilide, prepared according to Preparation 9.

(c) To 100 cm.$^3$ of a 5% gelatin solution with pH 6.5 are added 5 cm.$^3$ of a 5% alcoholic solution of m-fluorosulphonyl itaconic acid anilide prepared according to preparation 10. The gelatin solution is coated onto glass-plates, solidified and dried. After a storage for 36 h. at 50° C. the layers thus obtained do not dissolve anymore in boiling water.

*Example 9*

To 100 cm.$^3$ of a 5% aqueous gelatin solution are added 4 cm.$^3$ of a 5% alcoholic solution of m-fluorosulfonyl phenoxyacetic acid obtained according to Preparation 11. The gelatin slution is adjusted to pH 6.5, coated onto glass-plates, solidified and dried. After a storage for some days at room temperature the layers thus obtained do not dissolve anymore in boiling water.

*Example 10*

To 100 cm.$^3$ of a 5% aqueous solution of gelatin are added 5 cm.$^3$ of a 5% solution of m-(o-carboxyphenoxy carbonyl)-fluorosulfonylbenzene obtained according to Preparation 12. The gelatin solution is coated onto glass-plates, solidified and dried. After a storage for 36 h. at 50° C. the layers thus obtained resist to a treatment in boiling water.

*Example 11*

To 1 kg. of a high sensitive photographic gelatino silver halide emulsion containing 80 g. of gelatin are added 30 cm.$^3$ of a 5% alcoholic solution of m-fluorosulfonyl benzoic acid of Preparation 1. This emulsion is coated onto film, dried and stored for 10 days at room temperature. The treatment of the emulsion layer in an aqueous medium causes very little swelling and the layer which even resists to a treatment in boiling water. A same emulsion layer, without hardening agent already at 35° C. melts off in an aqueous medium.

We claim:

1. A composition comprising gelatin containing therein 1–5% based on the weight of gelatin of a compound according to the general formula:

$$FO_2SAr(X)_{n-1}—COOH$$

wherein

Ar is a bivalent aromatic nucleus selected from the group consisting of a phenylene nucleus and a naphthylene nucleus;

X is a bivalent organic radical selected from the group consisting of an alkylidene radical, a —NH-alkylene radical, a —O-alkylene radical, a —NHSO$_2$-arylene radical, a —NHCO-alkylene radical, a —NHCO-alkylidene radical, a —CONH-arylene radical, and a —CO—O-arylene radical; and n is a positive integer from 1 to 2.

2. A composition comprising casein containing therein 1–5% based on the weight of casein of a compound according to the general formula:

$$FO_2SAr(X)_{n-1}-COOH$$

wherein
- Ar is a bivalent aromatic nucleus selected from the group consisting of a phenylene nucleus and a naphthylene nucleus;
- X is a bivalent organic radical selected from the group consisting of an alkylidene radical, a —NH-alkylene radical, a —O-alkylene radical, a —NHSO₂-arylene radical, a —NHCO-alkylene radical, a —NHCO-alkylidene radical, a —CONH-arylene radical, and a —CO—O-arylene radical; and
- n is a positive integer from 1 to 2.

3. A photographic silver halide emulsion layer containing therein 1–5% based on the weight of gelatin of a compound according to the general formula:

$$FO_2SAr(X)_{n-1}-COOH$$

wherein
- Ar is a bivalent aromatic nucleus selected from the group consisting of a phenylene nucleus and a naphthylene nucleus;
- X is a bivalent organic radical selected from the group consisting of an alkylidene radical, a —NH-alkylene radical, a —O-alkylene radical, a —NHSO₂-arylene radical, a —NHCO-alkylene radical, a —NHCO-alkylidene radical, a —CONH-arylene radical, and a —CO—O-arylene radical; and
- n is a positive integer from 1 to 2.

References Cited in the file of this patent

UNITED STATES PATENTS

| | | |
|---|---|---|
| 2,614,930 | Lowe et al. | Oct. 21, 1952 |
| 2,691,582 | Lowe et al. | Oct. 12, 1954 |